US010512245B2

(12) United States Patent
Hazouri-Yeary

(10) Patent No.: US 10,512,245 B2
(45) Date of Patent: Dec. 24, 2019

(54) METHODS AND APPARATUS FOR A SELF CONTAINED EXPANDABLE PET CARRIER

(71) Applicant: Kimberly Hazouri-Yeary, Jacksonville Beach, FL (US)

(72) Inventor: Kimberly Hazouri-Yeary, Jacksonville Beach, FL (US)

( * ) Notice: Subject to any disclaimer, the term of this patent is extended or adjusted under 35 U.S.C. 154(b) by 229 days.

(21) Appl. No.: 15/801,695

(22) Filed: Nov. 2, 2017

(65) Prior Publication Data

US 2019/0124882 A1   May 2, 2019

(51) Int. Cl.
*A01K 1/00* (2006.01)
*A01K 1/02* (2006.01)
*A45C 7/00* (2006.01)
*A01K 1/015* (2006.01)
*A45F 3/04* (2006.01)
*A45F 3/00* (2006.01)

(52) U.S. Cl.
CPC ............ *A01K 1/029* (2013.01); *A01K 1/0157* (2013.01); *A01K 1/0254* (2013.01); *A45C 7/0063* (2013.01); *A45C 7/0086* (2013.01); *A45F 3/04* (2013.01); *A45F 2003/003* (2013.01)

(58) Field of Classification Search
CPC .... A01K 1/029; A01K 1/0157; A01K 1/0254; A01K 1/0272; A45C 7/0086; A45C 7/0063; A45K 3/04; A45K 2003/03; A45K 2003/045
See application file for complete search history.

(56) References Cited

U.S. PATENT DOCUMENTS

| 5,277,148 A * | 1/1994 | Rossignol | ............... | A01K 1/029 119/453 |
| 2008/0245312 A1* | 10/2008 | Leung | .................. | A01K 1/0245 119/497 |
| 2019/0021275 A1* | 1/2019 | Chaudhry | ............ | A01K 1/0254 |

* cited by examiner

*Primary Examiner* — Blake A Tankersley
(74) *Attorney, Agent, or Firm* — Joseph P. Kincart; Rogers Towers, P.A.

(57) ABSTRACT

The present disclosure provides methods and apparatus to support transport of a pet in a self-contained expandable carrier. In some examples, the carrier may be worn by a user to support the pet in a proximate location. A pet carrier which may be worn may provide comfort to pet owners while they travel.

20 Claims, 6 Drawing Sheets

METHODS AND APPARATUS FOR A SELF CONTAINED EXPANDABLE PET CARRIER

FIELD OF THE DISCLOSURE

The present disclosure relates to methods and apparatus to support transport of an animal/pet in a self-contained expandable carrier. The carrier may be worn by a user to support the pet in a proximate location.

BACKGROUND OF THE DISCLOSURE

The Air Carrier Access Act of 1986 (ACAA) allowed people with physical and/or mental issues to travel with animals. However, until this invention, no manner of organizing, safely displaying the animal, embarking and disembarking safely and quickly, etc. among the various forms to travel; no passenger, no animal, no mode of transport has been uniform until this invention. Additionally, there are many reasons that people travel with their pets from comfort to medical reasons. Medical research indicates numerous benefits to various types of people. For example, numerous people with anxiety find comfort in the presence of pets. Travelling, in general, is stressful and in various cases may aggravate conditions. Nevertheless, it can be quite difficult to travel with pets. There are aspects of lack of comfort for the animal, the traveler, other passengers' near the animal, assisting workers on the vehicle, and other parties involved. Furthermore, transport of animal can create issues for the travel environment including; but not limited to, transmission of odors, allergens and noises. As well, there may be security and safety issues. Security officers need easy means to inspect a pet/animal environment and pet/animal when it is travelling with a person. Accordingly a pet carrier that facilitates the ability of a person to travel with their pet while dealing with the various issues that may arise is needed.

SUMMARY OF THE DISCLOSURE

Accordingly, the present invention provides an apparatus that supports travel of a user with a contained animal that is within an animal carrier that is worn by a user. In some examples an animal transport apparatus may be formed with numerous functions and components. The animal transport apparatus may include a chamber for a primary containment of a pet; at least a first strap to hold the chamber against a user's body; a viewport, wherein the viewport is mounted on the chamber to allow a user to view within the chamber; a replaceable pet support pad, wherein the support pad provides a comfortable location for the pet to reside, and wherein the support pad includes absorbent material capable to absorb odors and allergens from the pet; and wherein the animal transport apparatus is worn on the user's body. The animal transport apparatus may be strapped onto the user. In some examples, a single strap may be used. In other examples two straps may be used. In each of these examples, there may also be a belt strap that may be used to support the weight of the animal transport apparatus; for including and not limited to, support, fashion, identify a type of animal and.

The animal transport apparatus may also comprise an expandable pet compartment wherein the expandable pet compartment is opened and placed at a location remote from the chamber.

The animal transport apparatus may also include the expandable pet compartment wherein the expandable pet compartment may be detached from the chamber. The expandable pet compartment may also comprise an accordion component which is stretched to move the expandable pet compartment.

In some examples, the animal transport apparatus may also comprise an access port. In some examples, the access port may be located on the side of the chamber.

The animal transport apparatus may comprise a HEPA filter. The HEPA filters may be useful for allow air to exchange into the pet carrier while not allowing odors and allergens to escape the animal transport apparatus into the travel environment.

The animal transport apparatus may comprise a color coded tag, wherein the color code indicates the nature of the animal contained in the animal transport apparatus. In a similar example, the animal transport apparatus may comprise a letter tag, wherein the letter tag indicates the animal contained. In some examples, the tag may indicate a picture of the animal.

The animal transport apparatus may comprise numerous attachment, and pockets to support the animal transport. In some examples, a pocket or pouch may be used to carry bags of food and/or water bowl stored in the animal transport carrier. In other examples, a pouch or pocket may store bags for storage of excrement of the animal.

The animal transport apparatus may be made from materials which are chosen to be fire retardant. A fire retardant material will add to a safety factor in an aircraft or other carrier and also be useful in the case of rescue workers carrying animals, wherein the device according to the present invention allows for two arms and hands to be free to be used during the rescue while the animal is contained within the animal transport carrier. A fire retardant quality of the material making up the animal transport carrier protects the animal from adverse conditions during the rescue, such as flames. In addition, a HEPA filter may assist in filtering out smoke particles during the rescue. In some examples, these materials may also be washable. In still other examples, the inside of the animal transport apparatus may include a removable and/or replaceable internal liner.

The animal transport apparatus may also include a luggage option that may be used to carry packed items. In some examples, the packed items may be of the user. In other examples, the packed items may be of the animal being transported. The apparatus of claim 1 further comprising an alarm.

The various apparatus of the invention may be used in various manners. In some examples, the animal transport apparatus may be used in a method of comforting a patient with distress while travelling. An animal, usually a pet of the traveler may be placed into the various designs of animal transport apparatus has have been described. The patient may wear the animal transport apparatus and board a means of travel. The owner and other people may be able to observe the pet through a view port. In other examples, the animal owner may be able to pet the animal through a port.

The various apparatus of the invention may be used to support a method for transporting an animal. A user of the animal transport apparatus may obtain the animal transport apparatus which may contain some or all of the various components as have been described. The user may place an animal into the apparatus and then board the means of travel. In some examples the means of travel may involve an airplane, a car, a bus, a train, a boat or other means of travel including a common carrier.

BRIEF DESCRIPTION OF THE DRAWINGS: INCLUDING BUT NOT LIMITED TO

The accompanying drawings, that are incorporated in and constitute a part of this specification, illustrate several embodiments of the disclosure and, together with the description, serve to explain the principles of the disclosure:

DETAILED DESCRIPTION

The present disclosure provides generally for apparatus of a self-contained expandable pet carrier. According to the present disclosure, the self-contained expandable pet carrier may provide a novel solution to traveling with pets that may allow a pet owner to keep their pet with them, and may be safer and more comfortable for the pets themselves.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

There may be numerous reasons for a person to have a companion pet. In some examples, a person may have a connections with their pet that makes them want to travel with the pet in close proximity to them. In some examples, the person may have a medical issue which is helped with the presence of a pet. For example, pets have been observed to offer comfort for people with any type of distress. The presence of a pet as a companion may be necessary for a person to be able to complete travel plans. Therefore, an apparatus that allows the pet to travel in comfort along with the traveler can allow the traveler to bring the pet in close proximity to them even while they are travelling in such vehicles as airplanes, trains, boats, busses, cars and other means of travel, or other common carrier.

Figure 1:
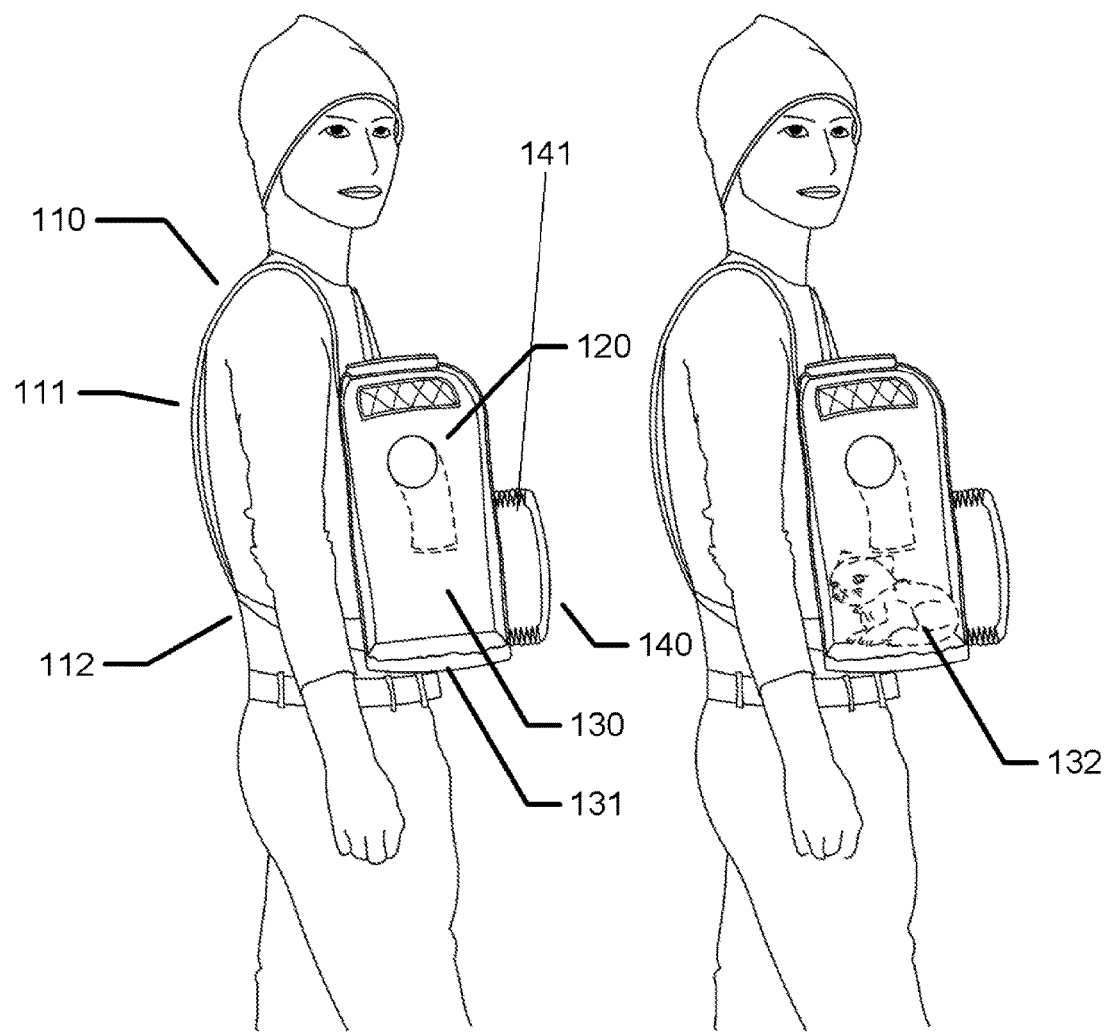
FIG. 1 illustrates an exemplary side view and a cross sectioned side view of a self-contained expandable pet carrier.

Referring now to FIG. 1, a side view of an exemplary self-contained expandable pet carrier may be seen. The self-contained expandable pet carrier may have a support system 110, to hold the self-contained expandable pet carrier securely on the pet owner's body, the support system 110 may include shoulder straps 111, to support the carrier on an owner's torso. Additionally, the support system may include a waist support strap 112, to help distribute the weight of the carrier, which may make it easier for a pet owner to support the carrier, as it may keep the carrier closer to the owner's body as well as distribute the load away from their shoulders. As a non-limiting example, the self-contained expandable pet carrier may be worn across an owner's front, as demonstrated in FIG. 1.

The self-contained expandable pet carrier may be constructed of various materials for certain features, including but not limited to flame retardant materials, to protect a contained pet from the heat of a fire in the event that a fire breaks out where the self-contained expandable pet carrier may be kept. The self-contained expandable pet carrier may also be constructed of materials that pertain to health related concerns stemming from the transportation of a pet 132.

These health related concerns may pertain to allergies, hazardous materials, and sanitation; as non-limiting examples. In some examples, a material for constructing the self-contained expandable pet carrier may be impervious to allergens, such as dander, and may keep these contained within the self-contained expandable pet carrier, which may prevent them from being introduced to the environment and setting off allergies of nearby individuals.

An additional non-limiting example may include materials that may contain fluids, such as possible bodily waste that a contained pet 132 may produce during their containment and travel. In some examples, adsorbent material, such as disposable pads may be included into the pet carrier and changed as needed.

An additional non-limiting example may include a material that may be strong enough to resist piercing or scratching of the material by the claws or teeth of a contained pet 132; this may not only increase the life-span of the self-contained expandable pet carrier, but may also prevent a contained pet 132 from possibly scratching or biting individuals in the vicinity of the self-contained expandable pet carrier.

Again referring to FIG. 1, an exemplary self-contained expandable pet carrier may include side access ports 120. A pet owner may insert their hands and arms into the side access ports 120 to access the central pet containment compartment 130 without opening the self-contained expandable pet carrier. Access to the contained pet 132 through the side access ports 120 may be facilitated through a fully enclosed sleeve or constricted closure that may prevent any allergens or other materials from leaving the self-contained expandable pet carrier. The central pet containment compartment 130 may contain a pet support pad 131.

Figure 6:
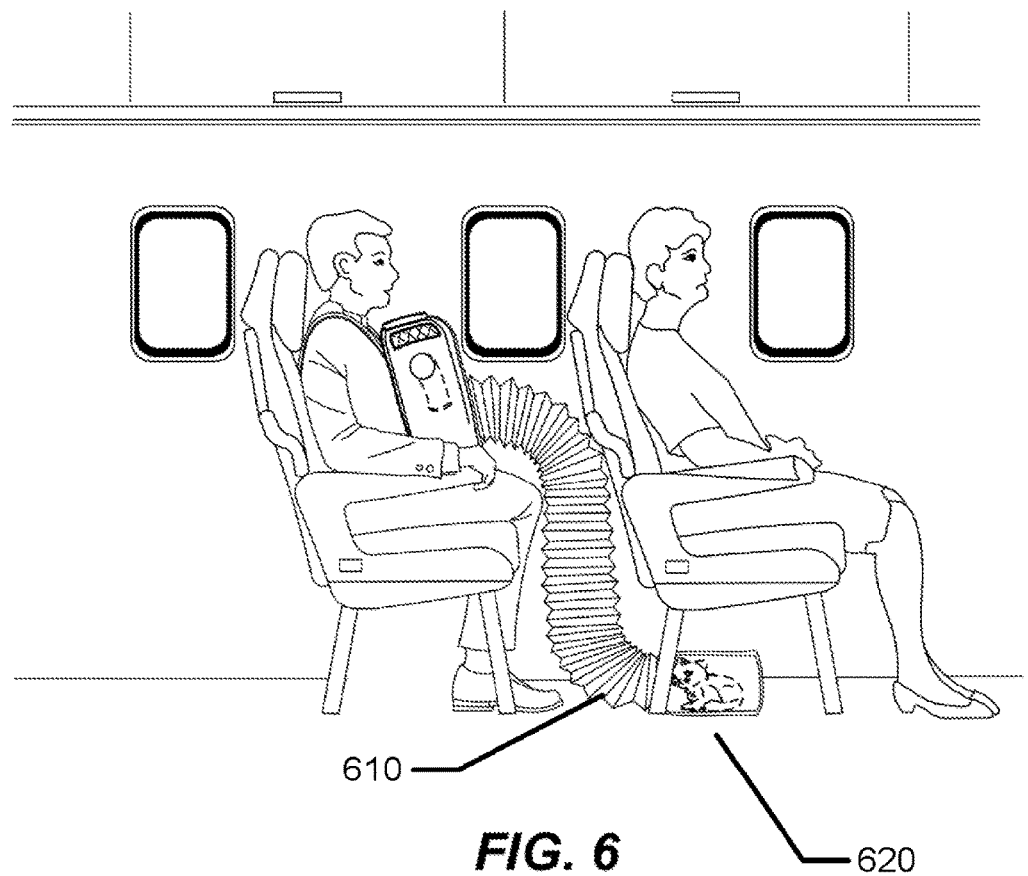
FIG. 6 illustrates an exemplary embodiment of a self-contained expandable pet carrier with an expansion chamber for the pet.

The pet support pad 131 may encompass a supportive base for a pet 132 that may be contained inside of the self-contained expandable pet carrier similar to the absorbent pads mentioned previously. The pet support pad 131 may be removable and replaceable, in the case of damage or soiling. Additionally, the pet support pad 131 may be washable or disposable, in the case of soiling, as non-limiting examples. A pet support pad 131 or other type of liner, may additionally include at least an area of highly absorbent material to mitigate any leakage of pet body fluids from transferring from inside the carrier to a surrounding area. The surrounding area may include, for example, the clothing of a person wearing an animal transport carrier or an aircraft interior. In addition to a central pet containment compartment 130, a self-contained expandable pet carrier may include an expansion chamber 140 which includes compressible material 141. While compressed in a carry position, the compressible material 141 is secured. While expanded (as illustrated in FIG. 6) the compressible material provides a pathway for the pet to travel to a location on a floor while remaining fully contained.

Figure 2:
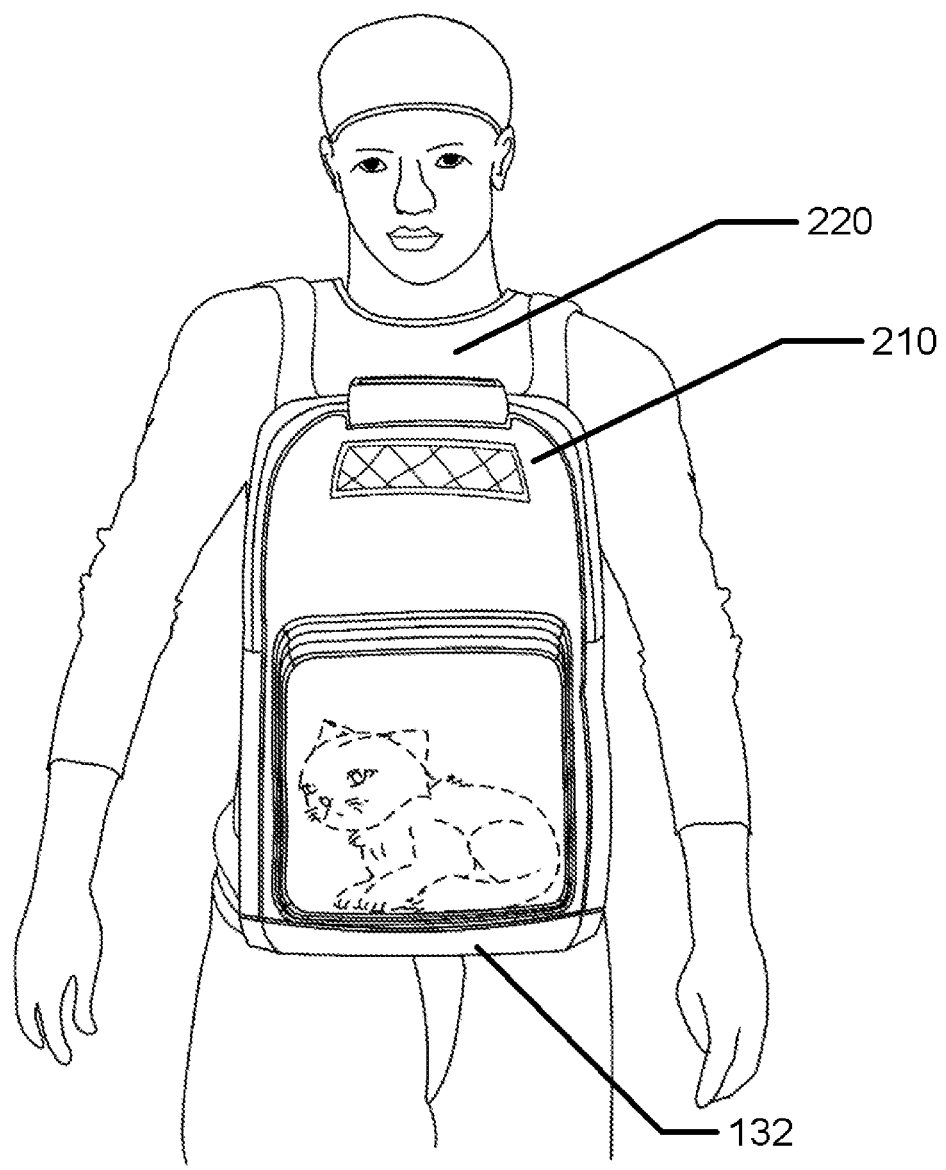
FIG. 2 illustrates an exemplary front view of a self-contained expandable pet carrier with an indication of a pet's location illustrated.

Referring now to FIG. 2, a front view of an exemplary self-contained expandable pet carrier may be seen. In this front view, a contained pet 132 may be seen inside of the self-contained expandable pet carrier. At the top of the self-contained expandable pet carrier, an airport 210 may be seen. This air port 210 may allow air to move in and out of the self-contained expandable pet carrier, to allow the contained pet 132 to breathe easily. The air port 210 may contain a HEPA filter, or other possible filter types that may allow for the passage of air through it, but may entrap allergens, scents, or other particulates that a contained pet 132 may produce, preventing them from being released into the environment around the self-contained expandable pet carrier. Air port 210 filters may need to be replaced or cleaned at certain time frequencies, depending on the type of filter and frequency of use of the self-contained expandable pet carrier.

Again referring to FIG. 2, a transparent viewing port 220 may be seen. The transparent viewing port 220 may be mounted at the top of the self-contained expandable pet carrier, to allow the owner to view the contained pet 132 while the owner is still wearing the self-contained expandable pet carrier. The transparent viewing port 220 may also let light into the self-contained expandable pet carrier, which may allow the contained pet 132 to see while they are contained, and may prevent them from being stuck in darkness. The transparent viewing port 220 may be composed of rigid or flexible plastic materials, as a non-limiting example. Viewing ports may be configured on various sides of the pet carrier in addition to the top viewing port, so that the animal may be viewed from various positions around the carrier. In some examples, the view port may be configured with closeable covers which may be zippered into place.

Figure 3:
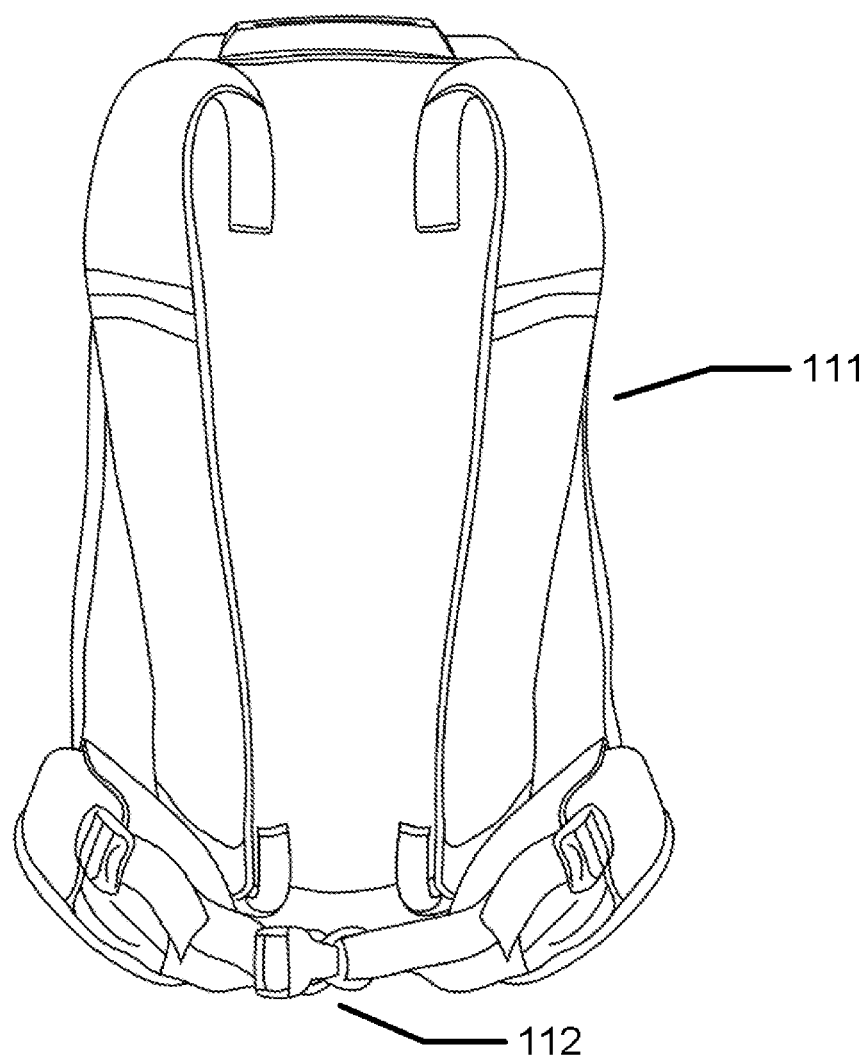
FIG. 3 illustrates an exemplary embodiment of a self-contained expandable pet carrier.

Now referring to FIG. 3, a rear view of an exemplary self-contained expandable pet carrier may be seen. In this rear view, an exemplary support system 110 may be more closely seen. The combination of shoulder straps 111 and waist support strap 112, making up the support system 110, may allow for hands free operation of the self-contained expandable pet carrier, which may support up to 30 pounds of weight.

Figure 4:
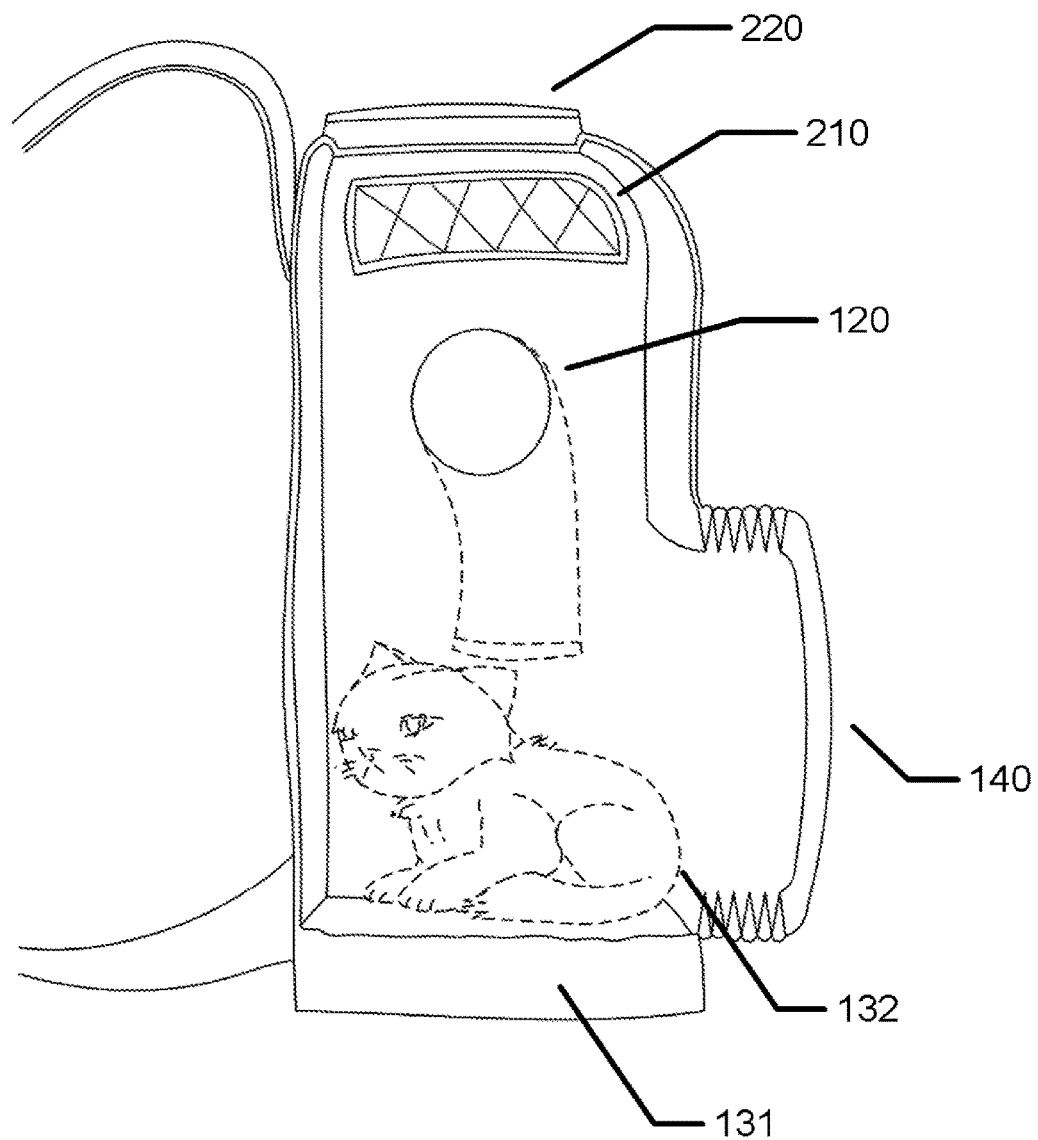
FIG. 4 illustrates an exemplary side view with air source.

Referring now to FIG. 4, a close up side view of the self-contained expandable pet carrier may be seen. The contained pet 132 may be seen within the carrier. The contained pet 132 may sit upon a pet support pad 131. The side access port 120 may be observed and may act as a means for the person carrying the pet to interact with the pet. As mentioned previously the sleeve may include a containment sheath that filters air so that allergens, smells and other aspects of a pet's environment are contained within the carrier. The air port 210 again may allow air to refresh the air in the container while filtering said air from escaping the carrier environment. A viewing port 220 is illustrate in the side view and again allows a wearer to see their pet and allows the pet to see the face of a wearer of the carrier. The side view further illustrates the expandable pet compartment.

Figure 5:
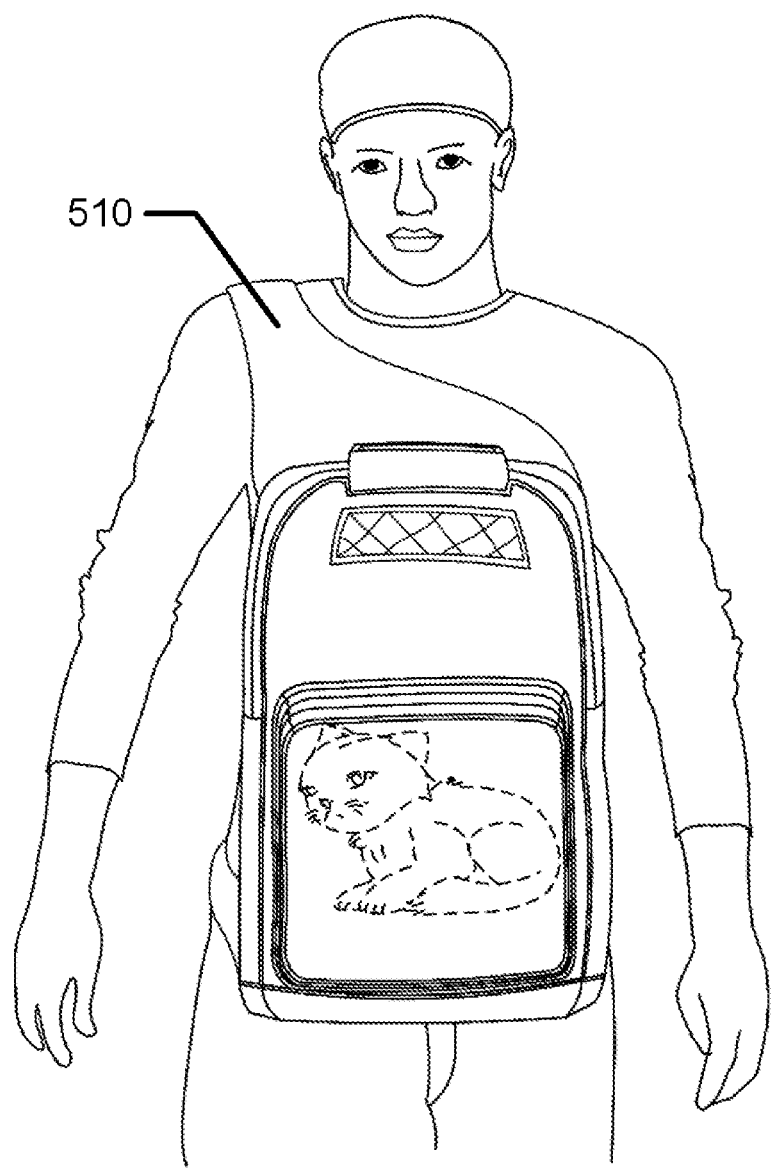
FIG. 5 illustrates an alternative exemplary front view of a self-contained expandable pet carrier with an indication of a pet's location illustrated.

Referring now to FIG. 5, an alternative front view of an exemplary self-contained expandable pet carrier may be seen. The exemplary self-contained expandable pet carrier shown possesses an alternative support system 110 with an alternative type cross strap 510. This cross strap 510 may achieve the shoulder support necessary to allow an owner to carry the self-contained expandable pet carrier, with only one shoulder strap, as opposed to two. Additionally, an exemplary self-contained expandable pet carrier may also possess a swaddled style side strap 520. A swaddled style side strap 520 may comprise a long section of cloth that wraps around an owner's waist, which may further secure the self-contained expandable pet carrier and help distribute its weight.

Referring to FIG. 6, an extension of the expandable pet compartment is illustrated. In some examples, the expandable pet compartment may include an expansion chamber 610 including an accordion type structure. As illustrated, an expansion of the expansion chamber 610 is sufficient to place the pet compartment 620 at a remote location, such as on a floor while the harness structure remains fixedly attached to the users torso. In some specific embodiments, the expandable pet compartment 620 may be placed under an airline seat directly forward of a user secured into their seat while the harness remains fixedly attached to the user and the expansion change forms a tunnel like enclosure capable of allowing the pet to traverse between the floor positon of the chamber and a lap position of the user. While remaining contained, the pet may be able to move between the pet carrier to the expandable pet compartment on its own volition or be placed in one position or another by the user. As illustrated in FIG. 6, in a mass transport vehicle, such as a train, bus or airplane, the expandable pet compartment 620 may extend via the expansion chamber 610 to the floor in front of the seat.

In some examples, the pet compartment may be detachable and re-sealable. Thus a passenger may carry the pet in the carrier and then move the pet into the expandable pet compartment and then place the compartment (separated from the carrier) on to the floor in front of the seat, for comfort. In some examples where the compartment detaches, the detached compartment may be configured to be locked into the seat belt of an adjacent travel seat which may be purchased by the traveler for the pet.

In some examples, the expandable pet carrier may be color coded in various manners for identification of the type or identity of the pet using the carrier. The outside of the pet carrier may include a sign identifying the type of pet carried within. The design of the pet carrier may include various patterns or designs which may include representations of dog, cats or other animals which may also include the type of animal within the carrier.

The carrier may have numerous support aspects incorporated into the body of the pet carrier. In an example, the carrier may have pockets specially designed for pet food and beverages including water. An entire pouch may be configured to detach from the pet carrier and may contain a water bowl, food, and spare bags and wipes and towels.

In some examples, the pet carrier lining may be designed to be detachable and separately washable. In some examples, the pet carrier may include an alarm system which may react under various scenarios including if the pet carrier is separated from the traveler by some distance. In some examples, the pet carrier may include a detachable section which may be used as a luggage compartment either for the pet or for the traveler.

CONCLUSION

A number of embodiments of the present disclosure have been described. While this specification contains many specific implementation details, they should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. An animal transport apparatus comprising:
    a primary chamber for a primary containment of a pet;
    a securing harness comprising at least a first strap to hold the primary chamber against a torso of a user's body;
    an expandable chamber providing a contained area and configured to expand to a sufficient length such that the pet can be moved from the primary chamber to a floor while the user is seated upright in a chair, the primary chamber is secured to the torso of the user using the securing harness, and the expandable chamber is connected to the primary chamber;
    a viewport, wherein the viewport is mounted on the chamber to allow a user to view within the chamber;
    a replaceable pet support pad, wherein the pet support pad provides a comfortable location for the pet to reside, and wherein the support pad includes absorbent material capable to absorb odors and allergens from the pet; and
    wherein the animal transport apparatus is worn on the user's body.

2. The apparatus of claim 1 wherein the expandable chamber is an expandable pet compartment, and
    wherein the expandable pet compartment is configured to be opened and placed at a location remote from the primary chamber.

3. The apparatus of claim 2 wherein the expandable pet compartment may be detached from the primary chamber.

4. The apparatus of claim 3 wherein the expandable pet compartment comprises an accordion component which is stretched to move the expandable pet compartment.

5. The apparatus of claim 4 further comprising an access port.

6. The apparatus of claim 5 wherein the access port is located on a side of the primary chamber.

7. The apparatus of claim 5 further comprising a HEPA filter.

8. The apparatus of claim 5 further comprising a color coded tag, wherein the color coded tag indicates the type of animal contained in the animal transport apparatus.

9. The apparatus of claim 5 further comprising bags of food stored in a pouch detachably connected to one or both of: the primary chamber and the harness.

10. The apparatus of claim 5 further comprising a pouch to store bags for storage of excrement of the animal.

11. The apparatus of claim 5 wherein a majority of the animal transport apparatus comprises fire retardant material.

12. The apparatus of claim 5 further comprising a letter tag, wherein the letter tag indicates the animal contained.

13. The apparatus of claim 5 further comprising a replaceable liner that is removable from the animal transport apparatus.

14. The apparatus of claim 1 further comprising at least a second strap.

15. The apparatus of claim 1 further comprising a luggage for travel items of the user.

16. The apparatus of claim 1 further comprising a luggage for travel items of the animal.

17. The apparatus of claim 1 further comprising an alarm.

18. A method of comforting a patient with obsessive compulsive disorder while travelling, the method comprising:
   obtaining an animal transport apparatus comprising:
      a primary chamber for a primary containment of a pet;
      at least a first strap to hold the primary chamber against a torso of a user's body;
      an expandable chamber providing a contained area and configured to expand to a sufficient length such that the pet can be moved from the primary chamber to a floor while the user is seated upright in a chair, the primary chamber is secured to the torso of the user using the first strap, and the expandable chamber is connected to the primary chamber:
      a viewport, wherein the viewport is mounted on the primary chamber to allow a user to view within the primary chamber;
   a replaceable pet support pad, wherein the support pad provides a comfortable location for the pet to reside, and wherein the support pad includes absorbent material capable to absorb odors and allergens from the pet; and
   wherein the animal transport apparatus is worn on the user's body;
   placing an animal into the animal transport apparatus;
   boarding a vehicle of mass transit; and
   wherein the patient views the animal through the view port and is comforted.

19. A method for transporting an animal, the method comprising:
   obtaining an animal transport apparatus comprising:
      a primary chamber for a primary containment of a pet;
      at least a first strap to hold the primary chamber against a torso of a user's body;
      an expandable chamber providing a contained area and configured to expand to a sufficient length such that the pet can be moved from the primary chamber to a floor while the user is seated upright in a chair, the primary chamber is secured to the torso of the user using the first strap, and the expandable chamber is connected to the primary chamber:
      a viewport, wherein the viewport is mounted on the primary chamber to allow a user to view within the primary chamber;
      a replaceable pet support pad, wherein the support pad provides a comfortable location for the pet to reside, and wherein the support pad includes absorbent material capable to absorb odors and allergens from the pet; and
   wherein the animal transport apparatus is worn on the user's body;
   placing an animal into the animal transport apparatus; and
   boarding a vehicle of mass transit.

20. The method of claim 19 wherein the vehicle of mass transit comprises an airplane.

* * * * *